(12) United States Patent
Eleftherakis et al.

(10) Patent No.: US 7,014,772 B2
(45) Date of Patent: Mar. 21, 2006

(54) FIBROUS FILTER ASSEMBLY AND METHOD

(75) Inventors: John G. Eleftherakis, Stillwater, OK (US); John E. Adams, Williamston, MI (US); Abe Khalil, Stillwater, OK (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 10/096,902

(22) Filed: Mar. 14, 2002

(65) Prior Publication Data

US 2003/0173301 A1     Sep. 18, 2003

(51) Int. Cl.
*B01D 35/06*     (2006.01)
(52) U.S. Cl. ............... 210/695; 210/168; 210/222; 210/223; 184/6.25
(58) Field of Classification Search ........... 210/168, 210/222, 223, 493.1, 695; 184/6.25
See application file for complete search history.

(56) References Cited

U.S. PATENT DOCUMENTS

| 3,768,233 | A | * | 10/1973 | Mateson ................ 210/222 |
| 3,784,011 | A | * | 1/1974 | Ward ..................... 210/223 |
| 4,309,290 | A | * | 1/1982 | Heitkamp .............. 210/695 |
| 4,495,074 | A | * | 1/1985 | Hagiwara et al. ...... 210/695 |
| 4,995,971 | A | * | 2/1991 | Droste et al. .......... 210/223 |
| 5,468,529 | A | * | 11/1995 | Kwon et al. ........... 210/503 |
| 5,556,540 | A | * | 9/1996 | Brunsting .............. 210/223 |
| 5,755,963 | A | * | 5/1998 | Sugiura et al. ........ 210/493.1 |
| 6,207,050 | B1 | | 3/2001 | Holifield ............... 210/223 |
| 6,280,638 | B1 | * | 8/2001 | Belchev ................ 210/259 |
| 6,464,863 | B1 | * | 10/2002 | Nguyen ................ 210/223 |

FOREIGN PATENT DOCUMENTS

GB     307 547     3/1929

* cited by examiner

*Primary Examiner*—David A. Reifsnyder
(74) *Attorney, Agent, or Firm*—Baker & Hostetler LLP

(57) ABSTRACT

A magnetic filter system for filtering metallic particles from a fluid is mounted inside a fluid vessel in a mechanical system, and includes a first magnetic layer and a second fibrous layer adjacent to and overlaying the magnetic layer.

18 Claims, 2 Drawing Sheets

FIBROUS FILTER ASSEMBLY AND METHOD

FIELD OF THE INVENTION

The invention generally pertains to the field of filtering fluids that are in a sump or other fluid handling system. More particularly, the invention relates to filters that can be used in wet mechanical systems that, for example, may not have any pressurized fluid system to circulate the fluid. Further, the invention relates to the field of the utilization of magnetic fields in such systems in order to magnetically attract and retain magnetic particles from the fluid being filtered.

BACKGROUND OF THE INVENTION

There are many applications in which it is desirable to filter fluids in a mechanical system. For example, internal combustion engines, vehicle transmissions, and gear boxes often contain a sump having motor oil or another suitable lubricant.

Some systems use a pump to circulate fluid and pump the fluid through a filter as it is circulated. However, even in pump-based systems, there are sometimes areas inside the fluid handling system where the fluid tends to collect without flowing and in these areas it can be desirable to provide additional filtration.

Furthermore, there are many mechanical systems that utilize lubricating, cooling and/or hydraulic fluids where the fluid is not actively circulated by a pump. In some of these systems, no pump is provided, and the fluid circulates merely based on motion imparted by internal moving components and/or temperature gradients. In these system, it is still desirable to have some way of removing contaminants, particularly metallic particulate contaminants, from the fluid. Examples of these systems include many types of gear boxes, including for example automotive differential casings.

Metal particulate contaminants often occur due to wear in mechanical systems. It is desirable to remove these from the systems so that they do not cause even further wear. While these particles sometimes fall out of suspension by sedimentation, mere sedimentation is often not enough to clear the particles. Also, even when the particles do fall out by sedimentation, a disturbance in the fluid such as by vibration can re-introduce the particles into the fluid.

Thus, there are many mechanical systems that would benefit from the ability to filter undesirable particles, including especially metallic particles, from the fluid, such as lubricating oil, differential fluid, transmission fluid, power fluid, brake fluid, anti-freeze, or any other type of fluid used in a mechanical system.

Heretofore, it has been known to simply mount a piece of solid magnetic material onto an inside surface of the fluid-containing housing. This piece of solid magnetic material attracts magnetic particles from the fluid in the vicinity of the magnet, and these particles move toward the magnet. As the particles come closer to the magnet, the magnetic force increases, thereby pulling the particles further toward the magnet until they adhere to the surface of the magnet. At this point, the particles generally tend to remain on the surface of the magnet due to the strong magnetic field on the surface of the magnet.

A disadvantage of the above-described arrangement is that the particles are merely adhered to the magnet by the magnetic force. It has been found in some instances that the particles will become relatively easily dislodged from the magnet, and will re-enter the fluid undesirably. For example, a sudden impact or jolt as is often experienced by automotive components, can loosen the metallic particles. Further, as the time of use of the filter increases, the surface area of the magnet tends to become covered with magnetic particles, and thus a film of particles can be created which tends not to retain further particles.

Another disadvantage with the use of a solid magnetic material by itself is that where the magnet is near a relatively high fluid flow or fluid movement region, the particles may only be initially attracted towards the magnet, but due to the fluid flow in the vicinity of the magnet may be carried past the magnet and not actually adhere to it. Also, in areas of high fluid flow, the particles tend to become dislodged more easily from the magnet by vibration.

From the foregoing, it can be seen that there is a need in the art for a magnetic filtration system that overcomes at least in part some of the above problems. In particular, there is a need in the art for a magnetic fluid filter arrangement that can not only desirably attract but also retain metallic particles from a fluid, even when the fluid is flowing past the filter assembly.

SUMMARY OF THE INVENTION

The foregoing needs are met, at least to a great extent by the present invention which in some embodiments provides a filter system that can not only desirably attract but also retain metallic particles from a fluid, even when the fluid is flowing past the filter assembly. The above and other features and advantages are achieved through the use of a novel filter system and method as herein disclosed. In accordance with one embodiment of the present invention A filter system for filtering fluid in a vessel is provided having a magnetic region; and a fibrous region substantially adjacent the magnetic region.

In accordance with another embodiment of the present invention, filter system for filtering a fluid in a vessel, the system having a fibrous structure region having filters, wherein at least some of the fibers are composed at least partially of a magnetic material.

In accordance with yet another embodiment of the present invention, a method for filtering a fluid in a vessel is provided. The method involves the steps of attracting metallic particles out of the fluid via a magnetic force and entrapping the attracted particles within a fibrous structure.

In accordance with still another embodiment, the invention provides filter system for filtering a fluid in a vessel, that has means for attracting metallic particles out of the fluid using a magnetic force, and means for entrapping the attracted particles, having a fibrous structure.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

In general, some embodiments of the present invention provide a filter system utilizing a two-part filter. The two-part filter includes a fibrous section substantially adjacent to a magnetic section, with the magnetic section generally disposed near an inner surface of the fluid handling system, and the fibrous section extending into the fluid to be filtered. The system may include a housing providing a lip around the periphery of the two-part filter. In other embodiments, the magnetic material may be a part or all of the fibrous section itself, and a separate section is optional.

Figure 1:
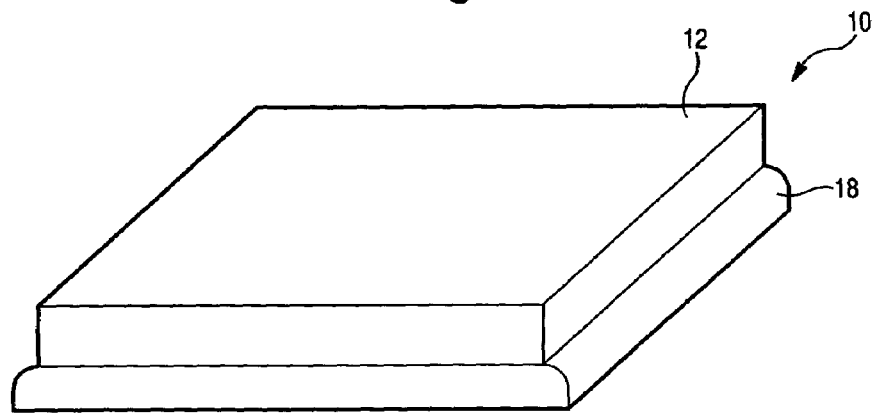
FIG. 1 is a perspective view of a filter assembly according to the present invention.
Figure 2:
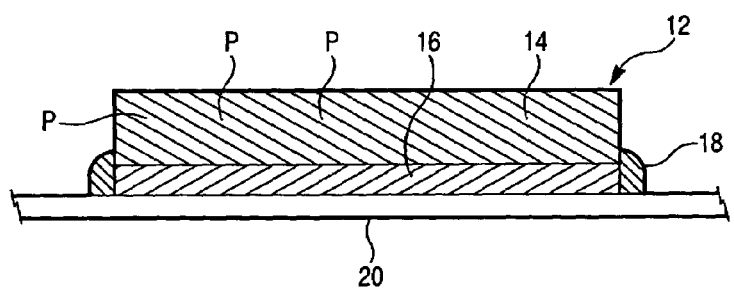
FIG. 2 is a cross-sectional view of a filter assembly according to the embodiment of FIG. 1, mounted on a surface of a fluid sump pan.

Turning now to the drawings, and particularly FIGS. 1 and 2, an embodiment of the filter system includes a magnetic filter system for filtering metallic particles from a fluid mounted inside a fluid vessel in a mechanical system, and includes a first magnetic layer and a second fibrous layer adjacent to and overlaying the magnetic layer.

More particularly, a filter system 10 includes a two-part filter 12 having a fibrous section 14, a magnetic section 16, and a peripheral housing 10 providing a peripheral lip. FIG. 2 illustrates the filter 10 system mounted on the inside surface of a sump wall 20.

The two-part filter 12 includes a fibrous section 14 and a magnetic section 16. The fibrous section 14 can in some embodiments be comprised of a fibrous lofted filter material, such as known conventional plastic lofted fibrous filter materials. Such materials are often provided in sheets, and can be cut into a suitable shape depending on the application.

Although FIG. 1 shows a square shape when viewed in plan view, this is for illustrative purposes only, and the filter 10 may be in any other shape, such as rectangular or oval, and can be shaped with a complex periphery to fit on a specially shaped sump wall, or other fluid facing surface as desired. In certain automotive applications, a single filter having a square shape and a plan view of approximately by 3 inches by 3 inches may be utilized. In some embodiments, such as in automotive transmission gear box and differential applications, the system 10 may be approximately 3/8 inches deep. These dimensions is given by way of example only, and other dimensions may be used as appropriate.

The fibrous section 14 is substantially proximate to, and may overlay, a magnetic section 16. The fibrous section 14 can be directly mounted to the magnetic section 16. This can be accomplished by glue, heat treatment or mechanical fastening means. The magnetic section 16 generally consists of a monolithic element of solid magnetic material, having a relatively thin cross section. Depending on the thickness selected, the magnetic section 16 may be somewhat flexible, and thus the entire two-part filter 12 may be flexible and able to bond to follow a curved sump pan surface if desired. Instead of a single magnetic section 16, one or more smaller magnetic sections may be provided on a surface of the fibrous section 14.

In some embodiments, the fibrous section 14 will solely be composed of a weave of conventional plastic or other nonmagnetic fibers. However, in some embodiments, magnetic fibers may be embedded in the fiber section 14 in order to enhance the attraction and retention of particulate matter as described in more detail herein. Further, in some embodiments all the fibers can be magnetic.

Figure 3:
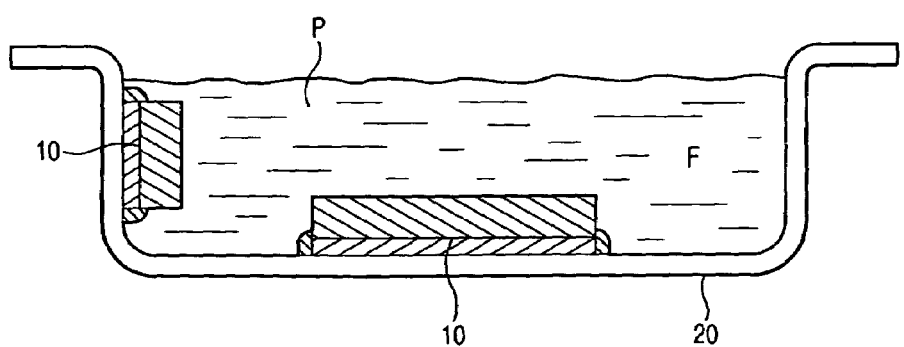
FIG. 3 is a cross-sectional view illustrating two filter assemblies according to the embodiments of FIGS. 1 and 2, arranged on the bottom and sides of a sump pan respectively.

A housing defining a lip 18 may optionally be provided around at least part of the periphery of the two-part filter 12. This lip 18 extends at least partly up along the lateral peripheral edges of the two-part filter 12. FIG. 2 illustrates the lip 18 extending upward having a height greater than the height of the magnetic section 16, but less than the height of the overall two-part filter 12. The lip 18 may also extend by a greater or lesser distance upward. If provided, the housing forming the lip 18 provides a side wall that prevents particles from escaping out the sides of the fiber section 14 due to vibration or being washed out by fluid flow. In the embodiments of FIGS. 1–3, the housing 18 providing the lip may be plastic or metal component, or may be made of other suitable material.

FIG. 3 illustrates by way of example only that one or more filter systems 10 according to the present invention can be disposed in a sump such as an oil pan 20. If the fluid F to be filtered contains metallic particles, it will undergo an effect whereby the metallic particles are drawn towards each filter system 10 by the magnetic section thereof. As the particles are drawn towards the filter system 10, they will flow in to the fibrous section 12 and generally become entrapped in the fiber section 12.

At this point, the particles will tend to be held and retained in the filter system 10 as shown in FIG. 2 by one or both of two effects. First, a continuing magnetic force received by the particles from the magnetic section 16 tends to retain the particles in the filter system 10. Further, the particles tend to be drawn at least partially into the fibers of the fibrous section 14, and if vibration occurs, may be drawn further in so that they work themselves deeper and deeper into the fibrous section 14. As this occurs, a resistance is provided by the fibrous section 14 against the particles being shaken loose from the system by jolts or vibrations.

If the sump wall 20 or other surface upon which the filter 10 is mounted is metallic, then the magnetic section 16 can provide the mounting force for the filter 10 by simple magnetic attraction to the sump wall 20. However, the housing providing the lip 18 can in some embodiments also provide for the mechanical mounting of the filter system 10 onto the sump wall 20. The filter 10 may also be attached either permanently or removably onto the sump wall 20 or other surface by mechanical means, such as fasteners, snap fit, overmolding, or by having the housing 18 integrally formed with the surface.

FIG. 3 illustrates schematically that one or more filter systems 10 can be implemented in a fluid system. The filter systems 10 can be oriented horizontally or vertically and facing upwards or downwards. Although in many preferred applications the system 10 will be resting on a lower wall and facing upwards, such orientation is not necessary in the present invention. The filter 10 can be used as a so-called sedimentation filter, especially when placed horizontally upon a lower, horizontal surface of a fluid handling vessel such as a pan or sump.

Further, although the examples shown include magnetic layers and/or magnetic fibers, these items can be omitted so that only a fibrous nonmagnetic region is used.

Filter systems according to the invention may be used in relatively quiescent zones of a fluid system (i.e., those having little or no flow rate past the filter system 10). However, because of the desirable particle retaining properties provided by the two-part filter 12 (including both the fiber section 14 and the magnetic section 16), it is possible to utilize filter systems 10 according to the present invention in relatively higher rate fluid movement areas, without losing particles into the flow.

Figure 4:
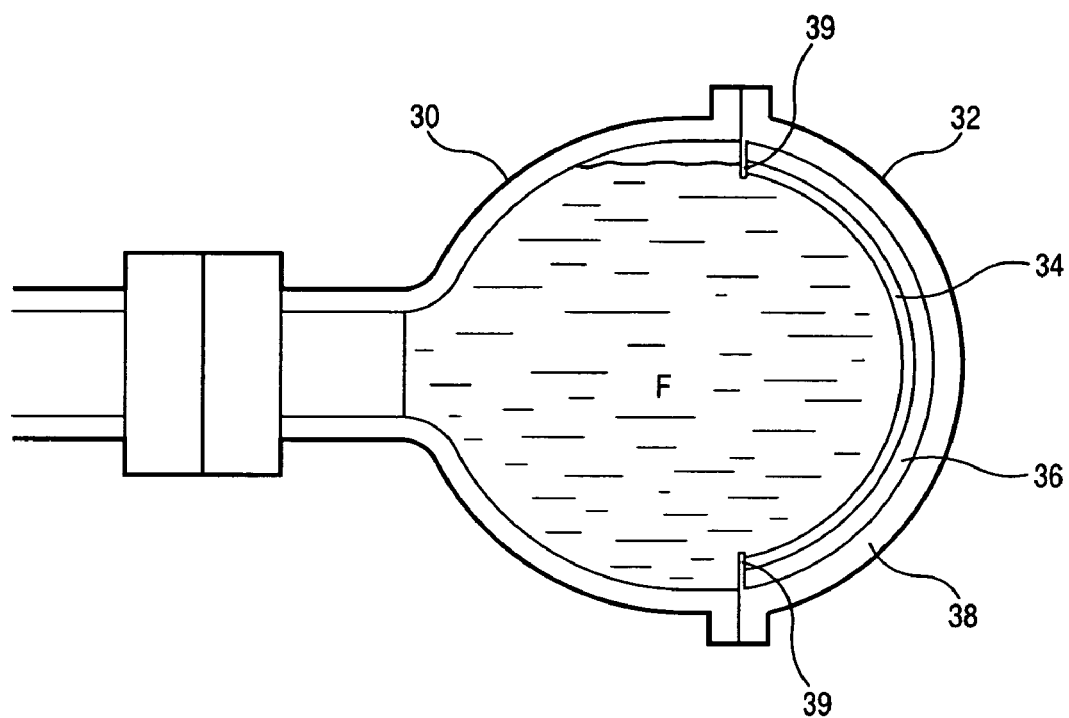
FIG. 4 is a schematic cross-sectional view illustrating an alternative embodiment of the present invention, utilizing a filter system according to the invention in combination with a differential cover.

While FIG. 3 schematically depicts a sump pan 20, the invention can be utilized on inside wet surfaces of a wide variety of fluid incorporating systems. For example, the embodiment of FIG. 4 depicts a filter system being utilized in connection with a vehicle axle differential system 30. In this embodiment, the typical rear differential cover is replaced by a combination cover and filter assembly 32. This assembly 32 includes a fibrous section 34 attached to a magnetic section 36 and projecting into the differential fluid F. A rear cover 38 serves both as the outer rear cover to the differential, and as the housing 18.

The arrangement 32 can be constructed as a discrete component that has the magnetic section 36 bonded to the inside of the rear cover 38, and the fibrous section 34 bonded to or retained against the magnetic section 36. The rear cover 38 can have an inwardly projecting lip 39 at the outer periphery of the magnetic and fibrous sections to retain particles that are entrapped therein from escaping out the outer periphery as described above. In this embodiment, the rear cover 38 may be made of conventional material such as metallic material, or may in some embodiments be a plastic component In the operation of various embodiments according to FIGS. 1–4, the fibrous section 14 tends to slow fluid flowing past the filter system 10, thus sometimes helping to cause suspended particles to be drawn by magnetic force (and/or gravity depending on orientation of the filter) into the fibrous material. In some embodiments, the fibrous section 14 could have a graduated density, being denser at the side near the magnet and more open at the side towards the fluid. In embodiments where the fibrous media includes a magnetic fibrous material, the magnetic fibers can increase the filter media's magnetic strength, thereby increasing the magnetic force field. In some embodiments, fibrous filter media having magnetic fibers embedded therein, or an entirely magnetic fibrous material could be used without the need for magnetic section 16 being present at all.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A filter system for filtering lubricating fluid in a vessel, the system comprising:
   a magnetic region that attracts ferromagnetic particles in the fluid; and
   a fibrous region overlaying and in direct contact with the magnetic region, disposed to capture particles attracted by the magnetic region, wherein the magnetic region and the fibrous region each have a respective periphery, and the system further comprises a housing providing a lip surrounding at least part of the periphery of at least one of the magnetic region and the fibrous region.

2. A filter system according to claim 1, wherein the magnetic region includes a sheet-like magnetic element.

3. A filter system according to claim 1, wherein the fibrous region includes a sheet-like fibrous element.

4. A filter system according to claim 1, wherein the magnetic region includes a sheet-like magnetic element, and the fibrous region includes a sheet-like fibrous element.

5. A filter system according to claim 1, wherein the magnetic region includes a sheet-like magnetic element, and the fibrous region includes a sheet-like fibrous element and wherein the fibrous region overlays the magnetic region.

6. A filter system according to claim 1, wherein the magnetic region is attached to a surface inside of the vessel.

7. A filter system according to claim 1, wherein the vessel is a sump.

8. A filter system according to claim 1, wherein the magnetic region is attached to a surface of the vessel by magnetic force.

9. A filter system according to claim 1, wherein the magnetic region is attached to a surface inside the vessel mechanically.

10. A filter system according to claim 1, wherein the fibrous region is attached to the magnetic region.

11. A filter system according to claim 1, wherein the magnetic region includes a sheet-like magnet element, and the fibrous region includes a sheet-like fibrous element, and wherein the magnetic and fibrous elements are both flexible.

12. A filter system according to claim 1, wherein the fibrous region is a sheet-like fibrous element comprising a fibrous material and having a first side facing the magnetic region, and a second side facing away from the magnetic region, and wherein a first density of the fibrous material facing the magnetic region is greater than a second density of the fibrous material facing away from the magnetic region.

13. A filter system for filtering a lubricating fluid in a vessel, the system comprising:
   a fibrous structure region having fibers, wherein at least some of the fibers are composed at least partially of a magnetic material and wherein the fibrous structure is configured to entrap particles attracted by the magnetic material wherein the fibrous structure is sheet-like and is mounted adjacent to and in direct contact with a sheet-like magnetic material, wherein the magnetic material and the fibrous structure each have a respective periphery, and the system further comprises a housing providing a lip surrounding at least part of the periphery of at least one of the magnetic material and the fibrous structure.

14. A filter system according to claim 13, wherein the fibrous structure overlays the magnetic material.

15. A method for filtering a fluid in a vessel, the method comprising the steps of:

attracting metallic particles out of the fluid via a magnetic force; and entrapping the attracted particles within a fibrous structure wherein the magnetic force is applied by a magnetic structure disposed adjacent and in direct contact with the fibrous structure, wherein the magnetic structure and the fibrous structure each have a respective periphery, and the method further comprises a housing providing a lip surrounding at least part of the periphery of at least one of the magnetic structure and the fibrous structure with a lip.

16. A method according to claim 15, wherein the fibrous structure overlays the magnetic structure.

17. A filter system for filtering a fluid in a vessel, the system comprising:

means for attracting metallic particles out of the fluid using a magnetic force; and means for entrapping the attracted particles, having a fibrous structure wherein the attracting means is disposed adjacent and in direct contact with the entrapping means, wherein the attracting means and the entrapping means each have a respective periphery, and the system further comprises a housing providing a lip surrounding at least part of the periphery of at least one of the attracting means and the entrapping means.

18. A filter system according to claim 17, wherein the entrapping means overlap the attracting means.

* * * * *